United States Patent
Hayashi

[11] Patent Number: 5,082,415
[45] Date of Patent: Jan. 21, 1992

[54] FORK LIFT STYLE LOADING APPARATUS

[76] Inventor: Takeshi Hayashi, No. 85-3, Mitsuicho, Bezaiten, Muya-Cho, Naruto-Shi, Tokushima, Japan

[21] Appl. No.: 389,898

[22] Filed: Aug. 4, 1989

[30] Foreign Application Priority Data

Aug. 4, 1988 [JP] Japan .................. 63-195340

[51] Int. Cl.⁵ .................. B65G 69/24; B66P 7/08
[52] U.S. Cl. .................. 414/343; 414/392; 414/398; 414/399; 414/401
[58] Field of Search .......... 414/390, 391, 395, 396, 414/399, 400, 401, 498, 389, 392, 398, 343

[56] References Cited

U.S. PATENT DOCUMENTS

| | | | |
|---|---|---|---|
| 3,040,914 | 6/1962 | Johnson et al. | 414/395 |
| 3,186,566 | 6/1965 | Spinanger et al. | 414/395 |
| 3,392,858 | 7/1968 | Fernstrom | 414/495 |
| 3,820,670 | 6/1974 | Pizzo et al. | 414/400 X |
| 3,938,678 | 2/1976 | Kern | 414/395 X |
| 4,027,771 | 6/1977 | Adams | 414/495 |
| 4,103,795 | 8/1978 | Miller | 414/498 X |
| 4,231,695 | 11/1980 | Weston | 414/498 X |
| 4,270,880 | 6/1981 | Allard | 414/389 X |
| 4,403,803 | 9/1983 | Szendrödi et al. | 414/398 X |
| 4,470,578 | 9/1984 | Arvidsson et al. | 414/498 X |
| 4,801,238 | 1/1989 | Pezzolato | 414/608 X |
| 4,832,559 | 5/1989 | Gebbardt | 414/398 X |
| 4,844,681 | 7/1989 | Pierre et al. | 414/398 |
| 4,919,582 | 4/1990 | Bates et al. | 414/347 X |

FOREIGN PATENT DOCUMENTS

| | | | |
|---|---|---|---|
| 0288726 | 11/1988 | European Pat. Off. | 414/396 |
| 2936160 | 4/1981 | Fed. Rep. of Germany | 414/398 |
| 2584685 | 1/1987 | France | 414/398 |
| 0013271 | 2/1977 | Japan | 414/400 |
| 0221017 | 10/1986 | Japan | 414/347 |
| 0175329 | 8/1987 | Japan | 414/398 |
| 0275929 | 11/1987 | Japan | 414/398 |
| 0275930 | 11/1987 | Japan | 414/398 |
| 0171718 | 7/1988 | Japan | 414/392 |
| 0624361 | 7/1981 | Switzerland | 414/395 |
| 1062154 | 12/1983 | U.S.S.R. | 414/398 |
| 1402526 | 6/1988 | U.S.S.R. | 414/398 |
| 2205809 | 12/1988 | United Kingdom | 414/398 |

Primary Examiner—Robert J. Spar
Assistant Examiner—James Eller
Attorney, Agent, or Firm—Wenderoth, Lind & Ponack

[57] ABSTRACT

A fork lift style loading apparatus is provided to improve truck cargo loading and unloading efficiency by allowing an entire truckload of cargo to be set on forks which simply move horizontally into the truck for loading. Loading time is drastically reduced by loading the cargo onto the forks prior to truck arrival. The loading appartus includes a platform lift which adjusts vertically to the truck height, a fork lift body which supports the cargo, and a cargo stand which fits in the cargo bed of the truck. Loading pallets are not required and cargo is handled by the truckload rather than by a pallet load as in a pallet loading system.

6 Claims, 10 Drawing Sheets

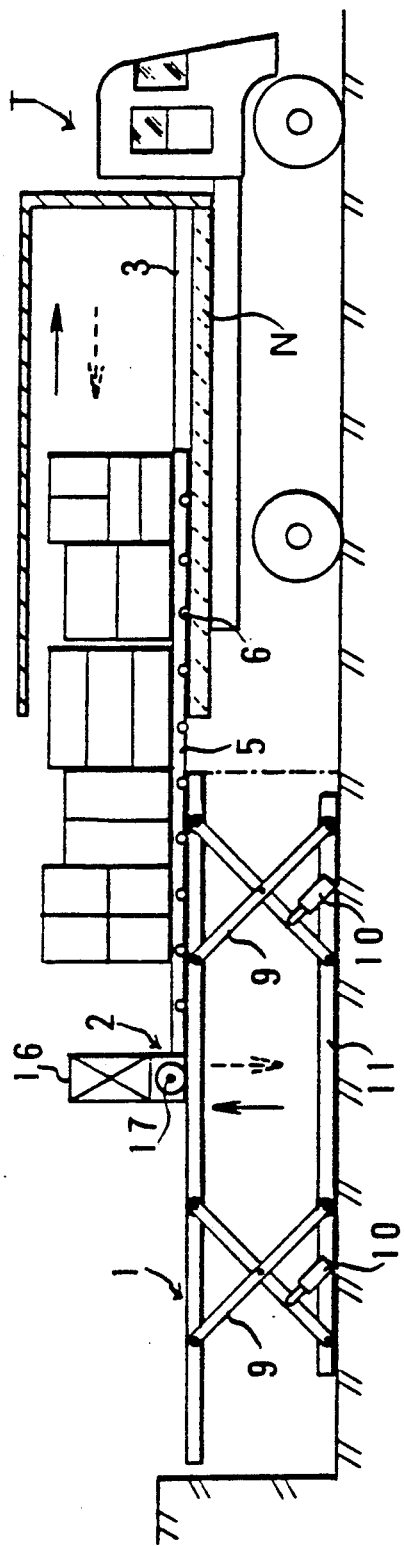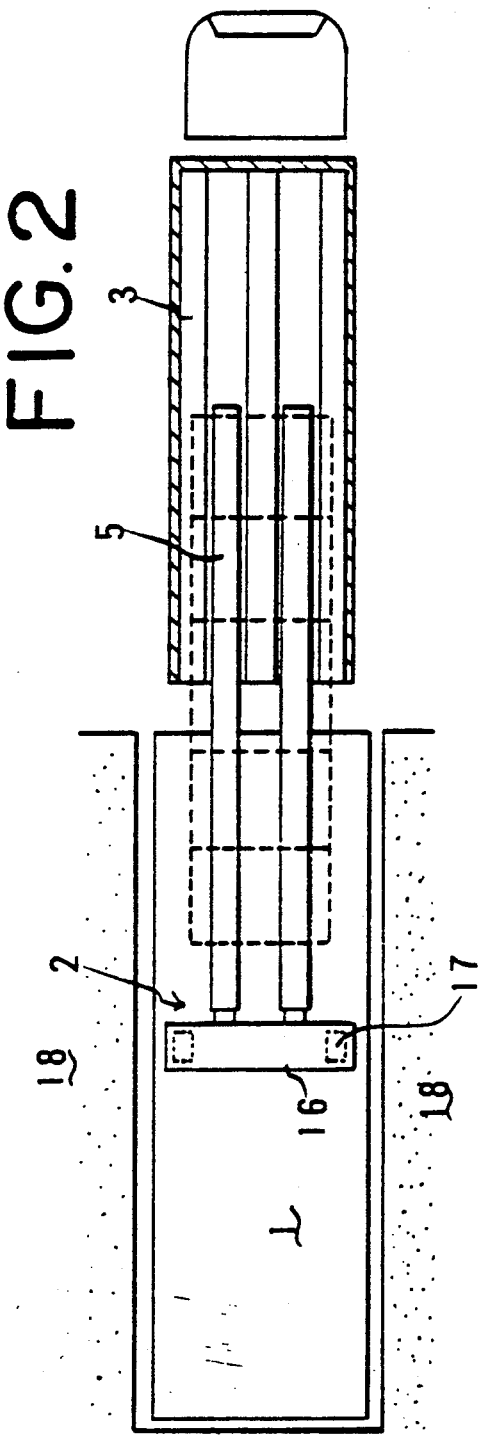

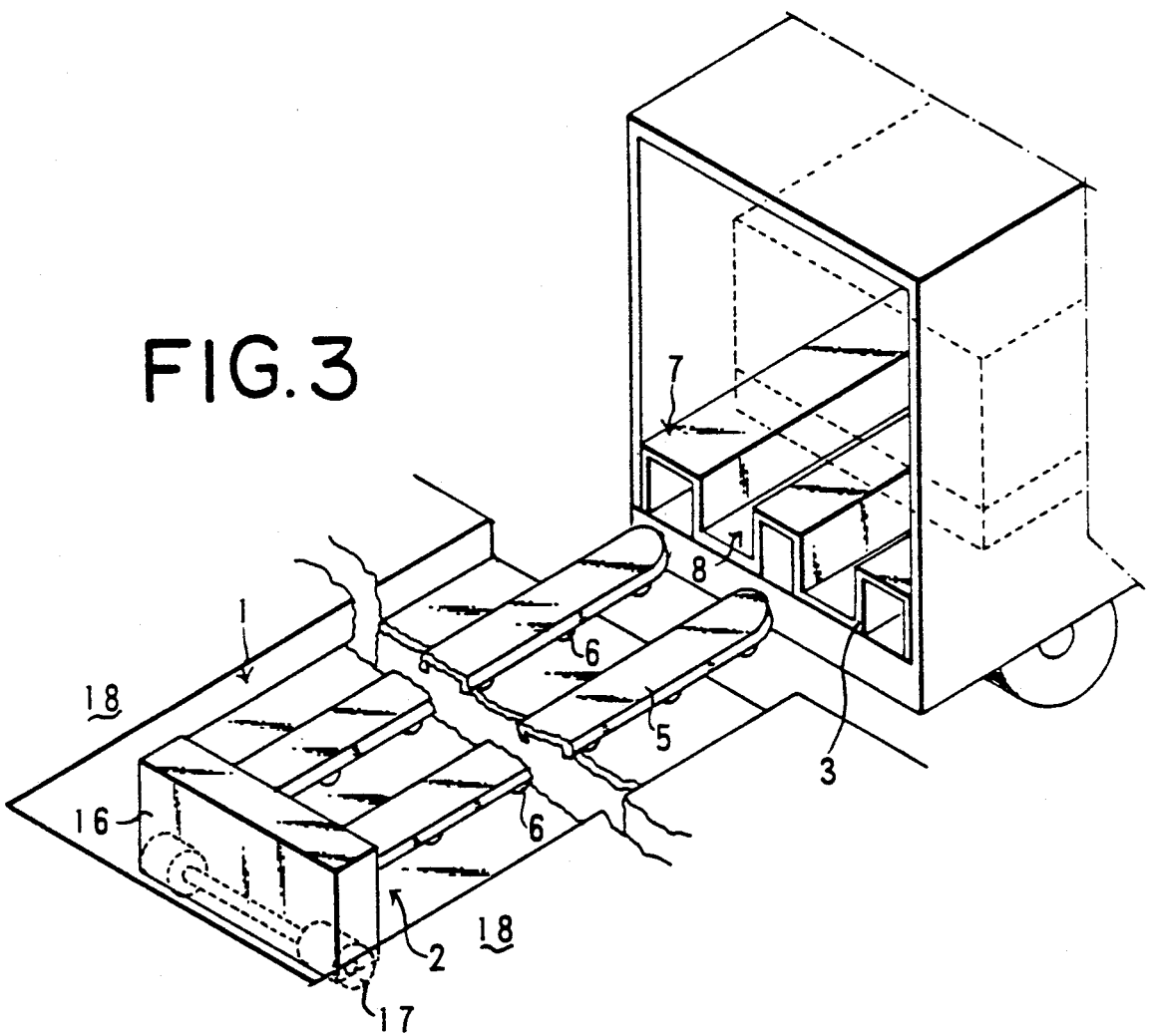

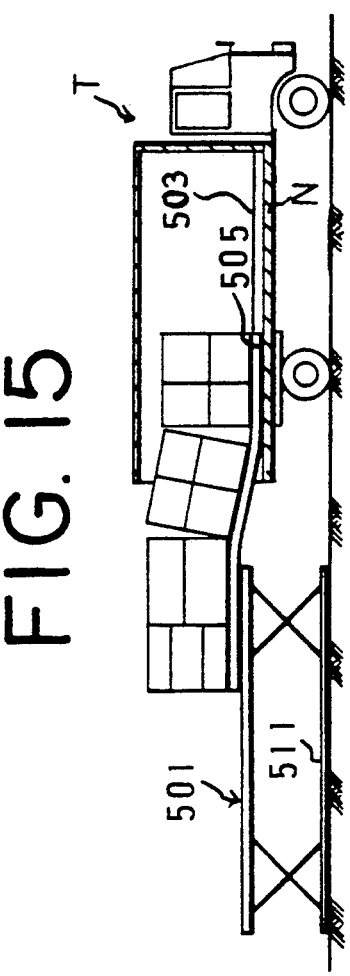
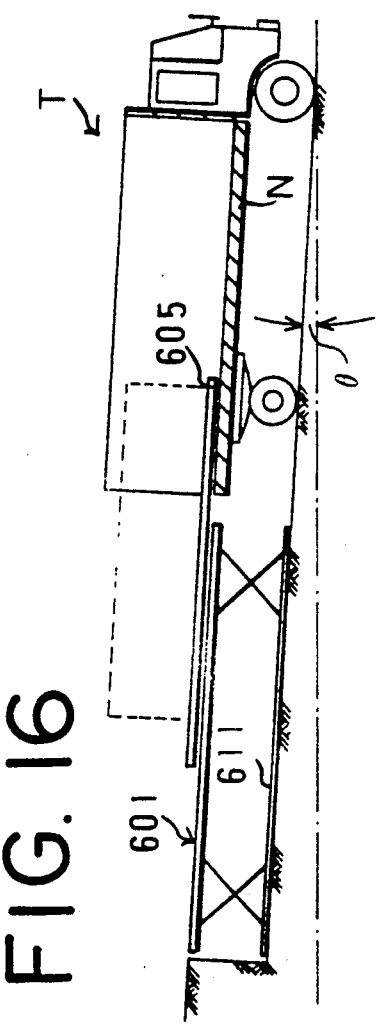

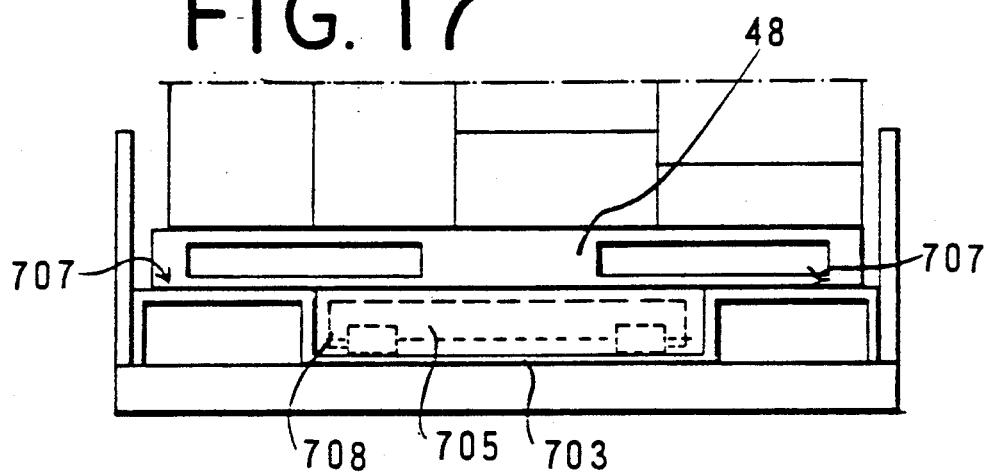
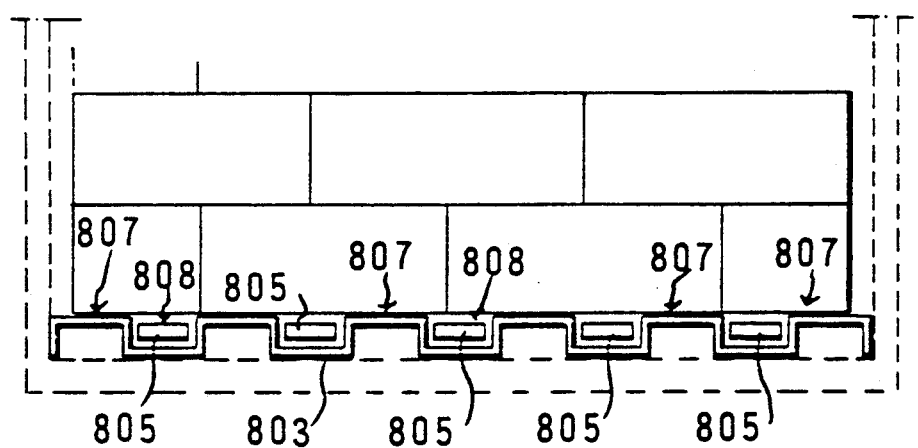

FORK LIFT STYLE LOADING APPARATUS

BACKGROUND OF THE INVENTION

This invention relates to loading apparatus used when cargo is loaded into or unloaded from a truck. More specifically, a plurality of pieces of cargo are loaded in advance on the long forks of the apparatus of this invention, then they are transferred onto the cargo bed of the truck as a stacked group. Further, cargo on the cargo bed can be transferred to the forks and unloaded in the same stacked condition.

Presently, pallets are generally used for loading cargo onto or unloading cargo from the cargo bed of a truck. Cargo is stacked on pallets and the individual pallets are loaded from the side of the cargo bed of the truck. Similarly, cargo is removed from the sides of the cargo bed of the truck along with the pallets. The sides of the cargo bed of some trucks, for example, refrigerated trucks, do not open. Consequently, the rear door of the cargo bed must be opened and the pallets loaded inside. Loading apparatus configured to move pallets towards the front of the cargo bed have been developed.

Further, panel van trucks with cargo beds having sides that open upwards have also been developed. Panel van trucks with this configuration have the advantage that pallets loaded with cargo can be loaded or unloaded from the sides.

In the pallet system of loading and unloading, the cargo bed many pieces of cargo are stacked onto pallets beforehand and then moved. This system has the advantage that loading labor and time can be reduced. This is because the number of pallets that require loading or unloading is much smaller than the number of pieces of cargo.

The item of prime importance in the cargo transport business is how much cargo can be shipped in a given time period. Shipping time or the actual time the truck is on the road is difficult to reduce because of road and traffic conditions. Therefore, the important target for efficiency improvement is the reduction of loading and unloading time.

Loading and unloading efficiency can be improved by a system of loading and unloading cargo stacked on pallets rather than individual pieces of cargo. However, when cargo is stacked onto pallets and loaded or unloaded from the truck's cargo bed, an 11 ton large size truck normally carries two rows of seven pallets, or a total of fourteen pallets, which requires ten to twenty minutes of loading time. The efficiency of a loading system using a fork lift to move loaded pallets cannot be improved beyond this.

SUMMARY OF THE INVENTION

The primary object of this invention is to provide a loading apparatus which reduces the time required for cargo loading onto and unloading from the cargo bed of a truck, which reduces the labor and manpower required for loading and unloading, and which further increases efficiency of the cargo transport business.

More particularly, the pallet loading system developed for the fork lift involves loading separate pieces of cargo, each weighing several kilograms to several tens of kilograms, onto pallets, and handling several tons to over ten tons of pallets, each weighing several hundred kilograms to a ton. This system allows several to several tens of pallets to be loaded or unloaded from the cargo bed of a truck.

By handling individual pieces of cargo by the pallet load, this pallet system reduces loading time from more than one hour to an average of ten to twenty minutes.

The present invention was developed to further reduce the truck loading time after arrival to a fraction of the present loading time. The present invention increases pallet tonnage (about one ton) to one truck load (from several tons to more than several tens of tons) by loading one truck load of cargo as a unit on forks and transferring the unit to the cargo bed of the truck.

The fork lift style loading apparatus of this invention comprises a platform lift, a fork lift body, and a cargo stand.

The platform lift has a rectangular upper surface extending horizontally which is free to be raised and lowered for leveling with the cargo bed of the truck.

The fork lift body is mounted on the upper surface of the platform lift.

The fork lift body is provided with forks for transferring cargo loaded on them.

The forks extend longitudinally of the platform lift for the purpose of transferring cargo between the platform lift and the cargo bed.

The forks are mounted in a fashion allowing freedom of movement longitudinally of the platform lift via wheels. The wheels allow the forks to move cargo mounted on them.

The forks are provided with elevator forks, which are free to be raised and lowered at small intervals, allowing the forks to be withdrawn without contacting the cargo.

The cargo stand is formed in a shape allowing it to be mounted in the cargo bed of the truck.

The upper surface of the cargo stand is provided with ridges and troughs extending lengthwise from the front to the back of the cargo bed.

The lateral width of the forks is set at a dimension allowing them to be freely inserted into the troughs of the cargo stand.

The height of the upper surfaces of the elevator forks is set higher than the ridges of the cargo stand in the raised position to allow cargo to be moved, and lower than the ridges of the cargo stand in the lowered position to allow cargo to be left in place.

The apparatus of this invention is used in the following manner. First, cargo is loaded onto the forks on the fork lift body in a fashion that matches the stacked cargo dimensions with the inside dimensions of the cargo bed of the truck. Meanwhile, a cargo stand is mounted on the cargo bed of the truck. The truck is backed in causing the back of the cargo bed to approach the front of the platform lift. Next, the height of the platform lift supporting the fork lift body is adjusted to match the height of the cargo bed. Specifically, the platform lift is adjusted to align the forks such that they can be inserted into the troughs of the cargo stand on the truck's cargo bed. The elevator forks are raised lifting the cargo on the forks. With the elevator forks in the raised position, the forks are inserted into the troughs of the cargo stand, and the cargo on the forks is transferred to the truck's cargo bed. In this operation, the wheels on the bottom of the forks roll on top of the platform lift of the fork lift body. At one point the wheels are separated from the platform lift and are disposed in midair, but since the cargo bed of the truck is close, they again roll along the bottom of the troughs of the cargo stand, and the cargo stacked on the forks can be moved horizontally into the back of the cargo bed of the truck.

Next, the elevator forks are lowered transferring the cargo on the forks to the upper surfaces of the ridges of the cargo stand on the truck's cargo bed. The loading is completed by withdrawing the forks back toward the fork lift body with the elevator forks in the lowered position.

Cargo previously loaded onto a truck is unloaded in the following manner. After the back of the truck's cargo bed has been positioned close to the fork lift body, the platform lift is raised or lowered to adjust its height. The ends of the forks face the troughs of the cargo stand. At this point the elevator forks are lowered to avoid contact with the cargo when the forks are inserted into the troughs. After fork insertion, the elevator forks are raised to transfer cargo on the cargo bed to the forks. The forks are moved horizontally from the cargo bed toward the platform lift to transfer the cargo from the truck's cargo bed to the platform lift.

In the manner described above, the apparatus of this invention advances the process of loading cargo onto a truck or unloading cargo from a truck. For cargo loading, regardless of whether the truck has arrived or not, cargo arranged to fit the dimensions of the arriving truck's cargo bed can be loaded onto the fork lift body beforehand. By doing this, as soon as the truck arrives, the height of the fork lift body can be adjusted and the forks can be started forward for loading. Similarly for unloading, as soon as the truck arrives, the height of the fork lift body can be adjusted and the forks can be started forward. Cargo can be handled as a unit for loading and unloading by grouping the cargo as single truckload. This allows a completion of the loading or unloading operation in an extremely short time after the truck arrives.

BRIEF DESCRIPTION OF THE DRAWINGS

FIG. 1 and FIG. 2 are a side view, and a plan view respectively, of the preferred embodiment of the loading apparatus of the present invention;

FIG. 3 is a perspective view of the invention in a state in which the forks are to be inserted into the cargo bed of the truck;

FIG. 12 through FIG. 16 are schematic diagrams showing cargo loading with the present invention;

FIG. 17 and FIG. 18 are cross sectional views showing representative examples of the cargo stand of the present invention.

DETAILED DESCRIPTION OF THE PREFERRED EMBODIMENT

Figure 4:
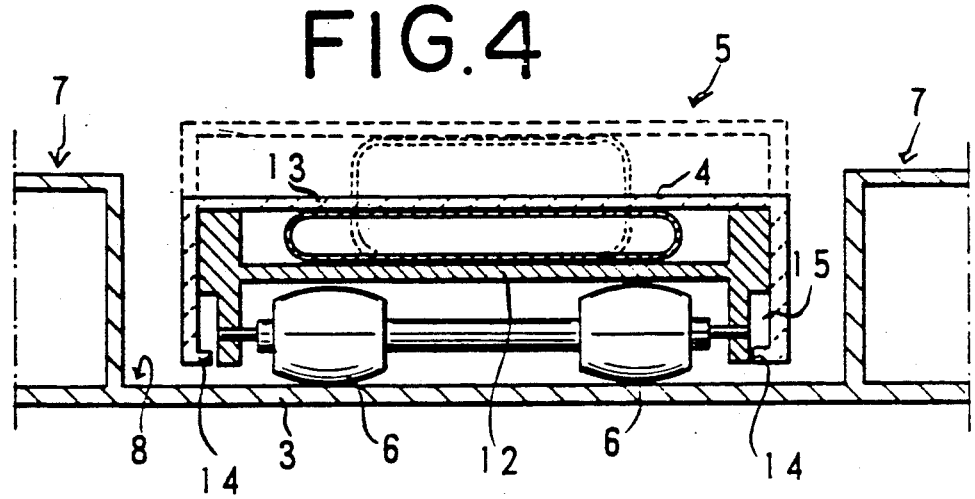
FIG. 4 is an enlarged cross sectional view of a fork.

A preferred embodiment of the present invention will now be described with reference to the accompanying drawings.

However, this embodiment is only a representative apparatus illustrating the technology embodied in the present invention, and the constituent parts of the apparatus are not limited to the materials, forms, structures, and dispositions described in the following. The apparatus of the present invention may have various additional changes within the limits described in the appended claims.

The loading apparatus shown in FIG. 1 through FIG. 4 comprises a platform lift 1, a fork lift body 2, and a cargo stand 3.

The platform lift 1 is provided with an elevator means allowing freedom of movement up and down for alignment with the cargo bed N of the truck T. The platform lift 1 has a rectangular upper surface extending in the horizontal direction.

The elevator means raises and lowers the platform lift 1 while maintaining it horizontal. The elevator means shown in FIG. 1 is provided with pantographic struts 9 and actuating cylinders 10. The pantographic struts 9 are installed at the four corners of the platform lift 1 in order to maintain the platform lift 1 horizontal during the raising and lowering thereof. Each of the pantographic struts 9 comprise two struts which pivot on a shaft connecting their midpoints. The upper ends of the struts attached to the platform lift 1, and the lower ends of the struts are connected to a base 11. The struts are connected at their midpoints and ends such that they are free to rotate in a vertical plane.

The actuating cylinders 10 are installed between the base 11 and the lower ends of the struts. Since the struts are attached to the platform lift 1 and the base 11 such that they pivot without moving horizontally on the actuating cylinder 10 side, the platform lift 1 is raised by extending the actuating cylinder rods, and lowered by retracting the actuating cylinder rods. Hydraulic cylinders may be used as the actuating cylinders 10, and the four actuating cylinders 10 are synchronized to operate together.

Any system which allows the platform lift 1 to be raised and lowered while maintaining a horizontal or near horizontal attitude can be adopted as the elevator means.

The fork lift body 2, which loads the cargo it carries into the truck T, disposed on the upper surface of the platform lift 1. The fork lift body 2 is provided with forks 5 and a driving means 16 for moving the forks 5 toward the cargo bed N of the truck T.

The forks 5 are disposed on the platform lift 1 such that they extend longitudinally of the rectangular platform lift 1. The bottoms of the forks 5 are provided with wheels 6 to allow the insertion of the forks 5 into the cargo stand 3 on top of the cargo bed N from the platform lift 1. Via the wheels 6, the forks 5 are free to move longitudinally of the platform lift 1.

The fork lift body 2 shown in FIG. 2 and FIG. 3 is provided with two forks 5 extending in a parallel fashion. The optimum number of forks 5 is determined by considering the width of the cargo bed N of the truck T.

As shown in FIG. 4, each fork 5 is provided with an elevator fork 4 free to move up and down in small increments, a separate fork frame 12, and an air bag 13 installed between the elevator fork 4 and the fork frame 12.

The elevator fork 4 has a lateral cross section shaped as an upside down U with the bottom edges provided with upward movement limiting stoppers 14. The fork frame 12 has an overall H shape with an outside width slightly narrower than the inside width of the elevator fork 4 to allow up and down movement of the elevator fork 4. The outside bottom edges of the fork frame 12 are provided with grooves 15 for allowing up and down movement of the upward movement limiting stoppers 14 on the elevator fork 4.

Wheels 6 are attached to the bottom of the fork frame 12 for rolling along the platform lift 1 and the cargo stand 3.

The air bag 13 is formed in a cylindrical shape from nonpermeable, pliable sheet material, and expands to raise the elevator fork 4 as it is filled with air. The upward position of the elevator fork 4 is limited by the upward movement limiting stoppers 14 moving up the grooves 15 and hitting the fork frame 12. The elevator fork 4 is lowered by exhausting air from the air bag 13. The downward limit position of the elevator fork 4 is set at the point where the underside of the elevator fork 4 hits the upper edges of the fork frame 12.

As shown in FIG. 1 through FIG. 3, the fork driving means 16 is provided at the underside thereof with driving wheels 17 which are rotated by a driving means such as a motor. Rubber tires are used for the driving wheels 17 to allow movement along the top of the platform lift 1 without slipping.

The cargo stand 3 is shaped to fit on the cargo bed N inside the truck T. Although it is possible to fix the cargo stand 3 on the cargo bed N of the truck T, it is desirable to place it in a removable fashion. A removable cargo stand 3 allows the truck T to be used in the common fashion when the cargo stand 3 is removed.

The upper surface of the cargo stand 3 is provided with ridges 7 and troughs 8 extending from the front to the back of the cargo bed N to allow the forks 5 to carry cargo into the truck T. The forks 5 are inserted into the troughs 8 of the cargo stand 3. Therefore, the width across the forks 5 is designed to be narrower than the width of the troughs 8.

When cargo is loaded onto the cargo stand 3, the elevator forks 4 are slightly raised so that the bottom of the cargo does not contact the cargo stand 3. After the cargo is loaded onto the cargo stand 3, the elevator forks 4 are lowered to a position below the underside of the cargo to avoid contact with the cargo when the forks 5 are extracted from the cargo stand 3. Namely, the elevator forks 4 are raised above and lowered below the ridges 7 of the cargo stand 3. Cargo loaded onto the cargo stand 3 from the elevator forks 4 may not be an ideal rigid body. Even with the position of the elevator forks 4 above the ridges 7 of the cargo stand 3, the underside of the cargo may contact the cargo stand 3. Therefore, for purposes of this specification, "the elevator forks 4 raised to a position above the ridges 7 of the cargo stand 3" should be taken to mean that the elevator forks 4 raised to a position which allows the cargo to be loaded onto and the forks 4 to be extracted from the cargo stand 3.

The loading apparatus shown in FIG. 1 through FIG. 4 loads cargo into the truck T in the following manner.

(1) The fork lift body 2 is positioned on the platform lift 1 and one truckload of cargo is placed on the forks 5.

(2) The cargo stand 3 is placed on the cargo bed N of the truck T, and the truck T is brought close to the platform lift 1 to position the troughs 8 of the cargo stand 3 in front of the forks 5.

(3) The platform lift 1 is raised or lowered to align the forks 5 on the platform lift 1 with the troughs 8 of the cargo stand 3.

(4) The forks 5 loaded with cargo are inserted into the cargo stand 3 along the troughs 8 by the driving means 16. At this point the air bags 13 are filled with compressed air so that the elevator forks 4 are in a raised position and the cargo is loaded into the truck T without contacting the ridges 7 of the cargo stand 3.

(5) When the cargo is inserted to the designated position on the cargo bed N of the truck T, the forward motion of the forks 5 is stopped, air is exhausted from the air bags 13 lowering the elevator forks 4, and all cargo supporting materials are transferred from the elevator forks 4 to the cargo stand 3.

(6) With the elevator forks 4 lowered, the forks 5 are retracted from the cargo bed N back onto the platform lift 1.

To allow efficient loading with the fork lift body 2 of the loading apparatus shown in FIG. 1 through FIG. 3, the loading apparatus is installed within a platform 18. Because the position of the platform lift 1 can be adjusted up and down, the platform lift 1 of the loading apparatus installed within the platform 18 can be positioned to align the upper surface of cargo on the platform lift 1 with the surface of the platform 18. This feature allows efficient stacking of the cargo.

Figure 5:
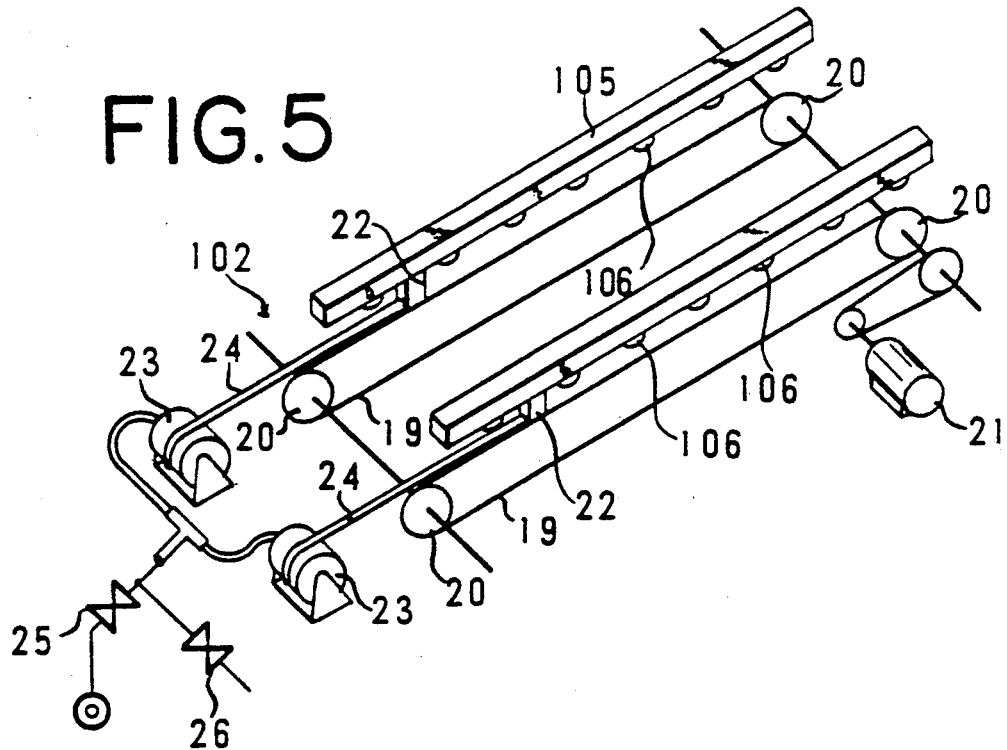
FIG. 5 through FIG. 7 are perspective, side and cross-sectional views, respectively, of the fork driving means.
Figure 6:
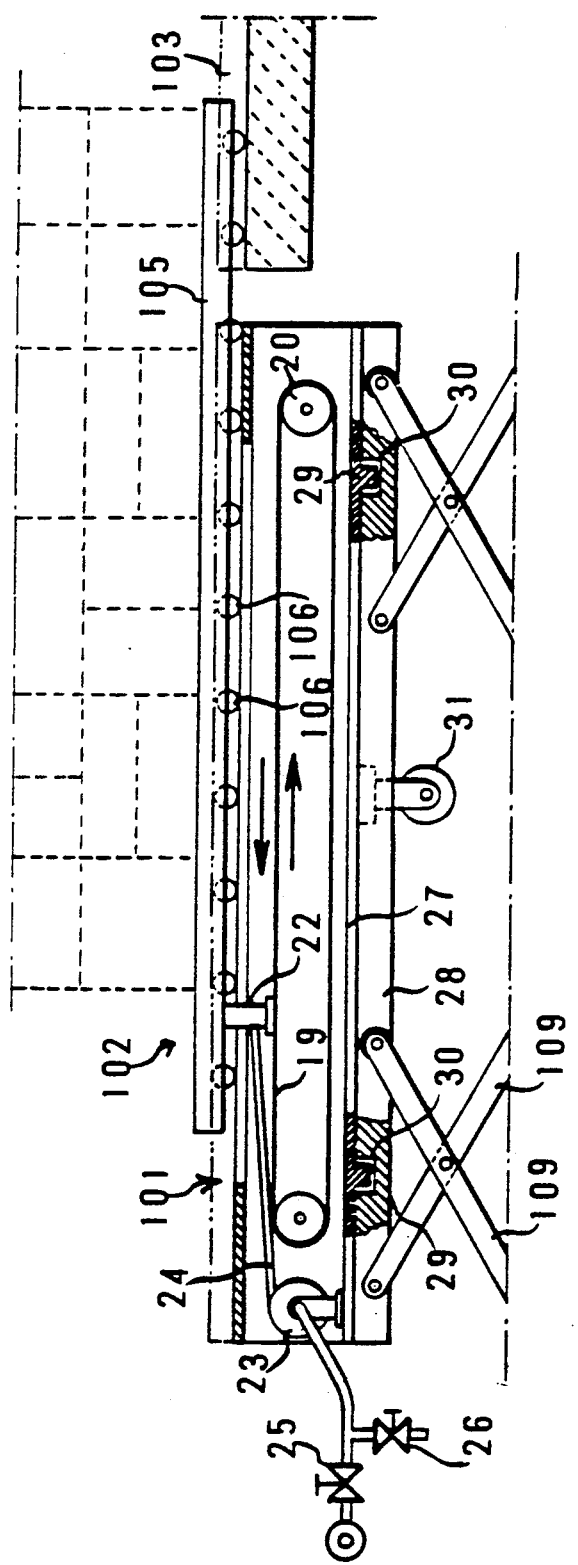
Figure 7:
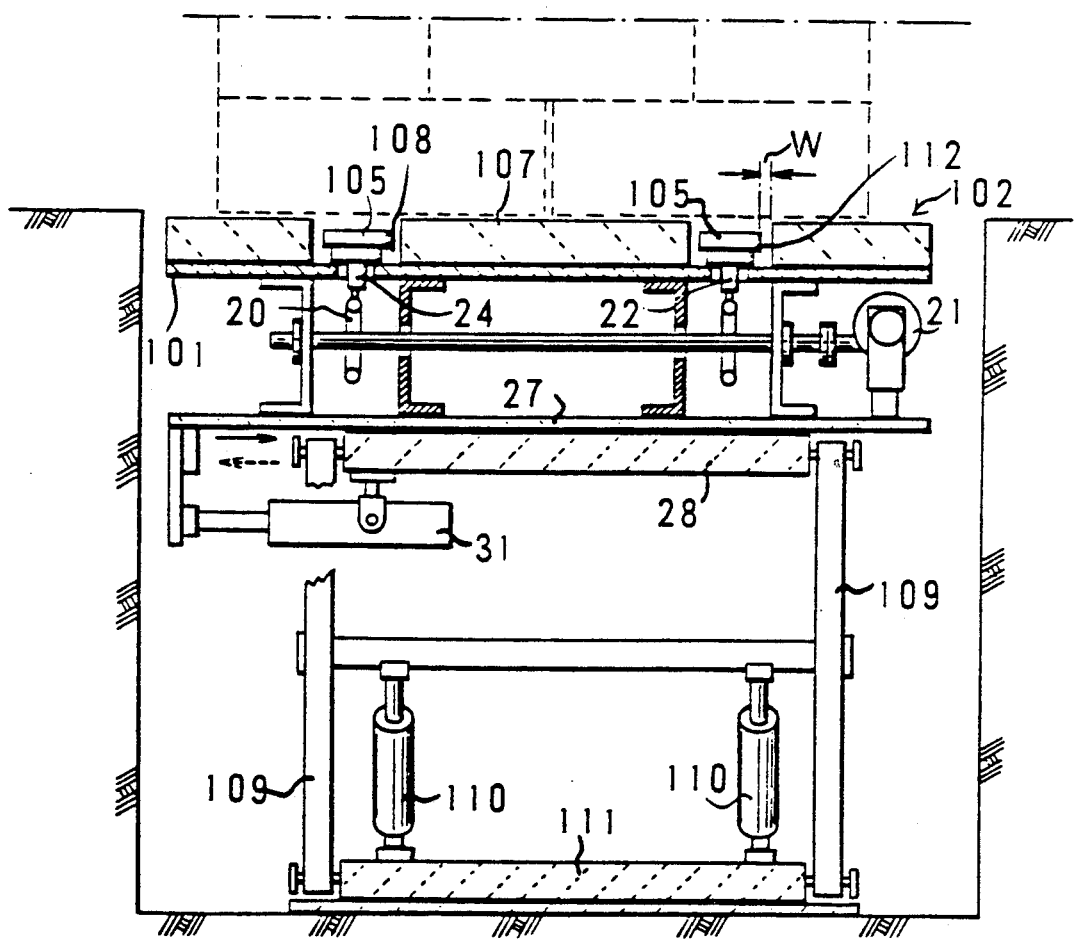

FIG. 5 through FIG. 7 show loading apparatus with different driving means for the forks. These loading apparatus are provided with two chains 19, sprockets 20 for driving the chains 19, and a motor 21 to drive the sprockets shaft.

The two chains 19 are connected to the fork frames 12 through driving pieces 22. Since the chains 19 move the forks 105 in the forward and reverse direction, the chains 19 are installed in a position under the trajectory of motion of the forks 105. In this configuration, the driving means can be contained under the surface of the platform lift 101. Therefore, as in the loading apparatus of FIG. 1, this configuration has the feature that the driving means does not interfere with cargo loading.

The loading apparatus shown in FIG. 5 is provided with hose reels 23 for supplying air to, and exhausting air from the air bags to raise and lower the elevator forks. Hoses 24 that connect to the air bags 13 are wound onto the hose reels 23. The hose reels 23 are connected to an air supply through an air inlet valve 25, and are opened to the atmosphere through an exhaust valve 26. Hose 24 is fed off the hose reels 23 when the forks 105 are moved forward, and wound onto the hose reels 23 by spring loading (not illustrated) when the forks 105 are retracted.

The loading apparatus shown in FIG. 6 and FIG. 7 further illustrates a platform lift 101 configured with a sliding platform 27 on a lift frame 28 to make the alignment of the forks with the truck easier. The lift frame 28 is mounted for vertical movement on base 111 via struts 109.

The sliding platform 27 is mounted on the lift frame 28 in a manner allowing it to move freely laterally. As shown in FIG. 6, the bottom surface of the sliding platform 27 is provided with rails 29 extending laterally, and the upper surface of the lift frame 28 is provided with guideways 30 for the rails 29 to slide in. The rails 29 slide in the guideways 30 during lateral translation of the sliding platform 27 with respect to the lift frame 28.

The sliding platform 27 is attached to the lift frame 28 through a power cylinder 31. Turning to FIG. 7, when the rod of the power cylinder 31 extends, the sliding platform 27 is moved to the left, and when the rod of the power cylinder 31 retracts, the sliding platform 27 is moved to the right.

With this configuration of the loading apparatus, even when the truck approaches the platform lift 101 in a slightly misaligned fashion, the forks 105 can be accurately inserted into the troughs 108 of the cargo stand 103 by moving the sliding platform 27 laterally while watching the truck's cargo stand 103. When the truck is brought toward the platform lift 101, the truck must approach while parallel to the platform lift 101 and while not laterally offset from it. Bringing the truck in lined up with the platform lift is relatively easy, but bringing the truck in in a parallel fashion with the troughs of the cargo stand lined up with the forks is very difficult. If the platform lift 101 can be moved laterally to line up the forks 105 with the troughs 108 of the cargo stand 103 after the truck has made its approach in a parallel fashion, then the truck's approach can be extremely simple and easy.

Further, the upper surface of the platform lift 101 of the loading apparatus shown in FIG. 7 is provided with ridges 107 and troughs 108 in the same manner as the cargo stand 103. The forks 105 are insertable within the troughs 108 of the platform lift 101. When the stacked cargo is loaded into the truck T, the forks 105 must be raised at least above the ridges 107 in order to lift the cargo, and when cargo is put on the platform lift 101, the forks 105 must be lowered below the ridges 107. This configuration has the advantages that cargo can be loaded on the platform lift 101 in a stable manner, and that cargo can be slid horizontally onto the platform lift 101.

The width of the troughs on the platform lift can be designed narrower than the troughs 108 of the cargo stand 103. The reason for this is that in actual operation, it is difficult to achieve alignment of the forks 105 with the troughs 108 of the cargo stand 103 entirely along the direction of fork insertion. Therefore, it is necessary to make the troughs 108 sufficiently wide in comparison with the forks 105, and establish somewhat of a gap between the two. Consequently, as shown in FIG. 7, the gap between the forks 105 and the platform lift 101 can be made narrower than the gap W between the forks 105 and the side walls of the troughs 108 of the cargo stand.

Figure 8:
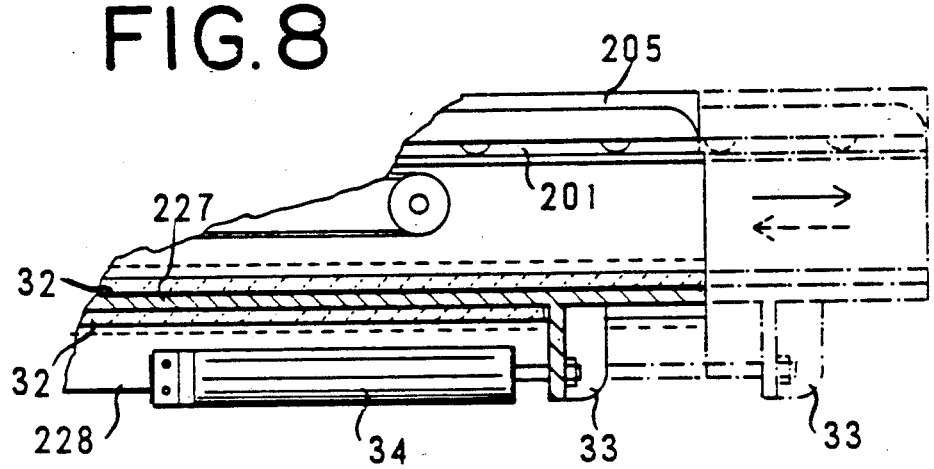
FIG. 8 is a partial cross-sectional view of the forward and rearward moving platform lift.

Further, the loading apparatus shown in FIG. 8 is provided with an advancing and retreating platform lift 201 to make the truck's approach to the platform lift 201 more convenient. The platform lift 201 comprises the sliding platform 227 and the lift frame 228. The sliding platform 227 is installed on the lift frame 228 in a fashion allowing freedom of movement via a lubrication sheet 32. Arms 33 protrude from the bottom surface of the sliding platform 227, and the rods of power cylinders 34 are connected to the lower ends of the arms 33. The back ends of the power cylinders 34 are fixed to the lift frame 228. The power cylinders 34 are installed in line at both sides of the sliding platform 227 and operate synchronously to translate the sliding platform 227 forward and backward.

The lubrication sheet 32 provided between the sliding platform 227 and the lift frame 228 reduces sliding friction allowing smoother movement of the sliding platform 227.

With this loading apparatus, the platform lift 201 can be moved to the cargo bed N of the truck T. For this reason, when the truck T is backed up to approach the platform lift 201, the truck can be stopped even with some gap remaining between the cargo bed N and the platform lift 201. Consequently, this loading apparatus has the advantage that there is some forward and back tolerance in the truck's stopping position and, therefore, the truck's approach to the platform lift 201 is simple.

Figure 9:
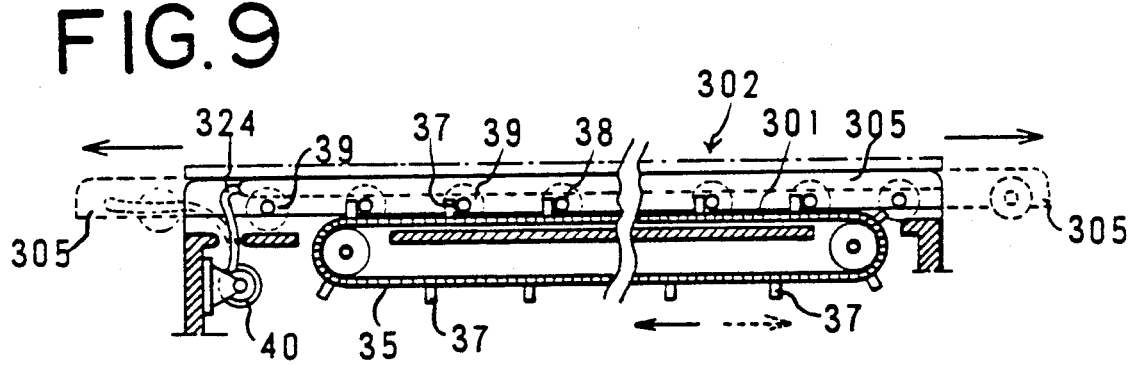
FIG. 9 through FIG. 11 are a side cross-sectional view, a bottom partial side view, and an enlarged view, respectively, of the primary elements of the fork driving means.
Figure 10:
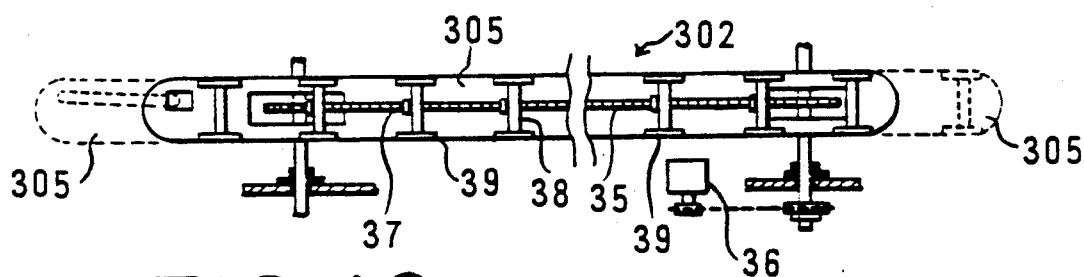
Figure 11:
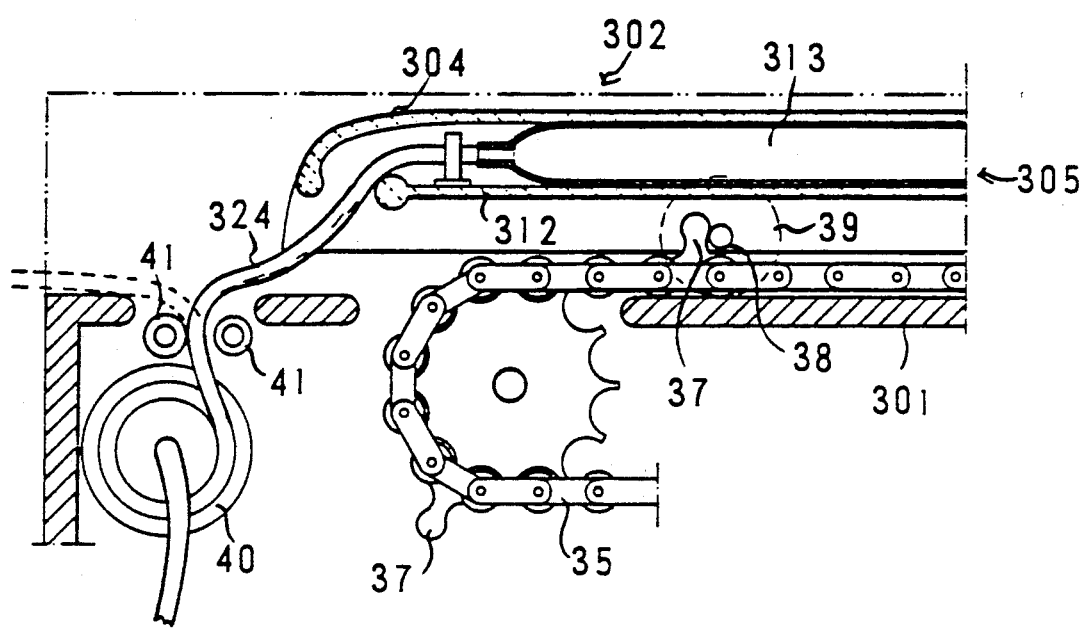

Turning to FIG. 9 through FIG. 11, a driving means for moving the forks in a similar manner in both the forward and reverse directions is shown. This driving means comprises chains 35, installed under the forks 305, and a motor 36 to drive the chains 35. Driving pieces 37 are fixed to the chains 35 at equal intervals. The chains 35 pass vertically through the platform lift 301 at both ends, with the upper run traveling along the top of the platform lift 301, and the lower run traveling under the platform lift 301. Roller type chains having large diameter rollers with the chain pins as shafts (not illustrated) are used to allow the chains to roll along the top of the platform lift. On the fork 305 side, shafts 38 are provided for the driving pieces 37 to push against. The shafts 38 are attached at both ends to the forks 305, and wheels 39 are mounted on both sides of the shafts 38 in a fashion allowing free rotation. In other words, the parts of the forks 305 that are pushed against by the driving pieces 37 serve a double purpose as axles for the wheels 39.

Turning to FIG. 11, the air bag 313 is installed within the fork 305 between the elevator fork 304 and the fork frame 312. The same structure as shown in FIG. 4 can be adopted for the air bag 313 supporting fork 305. The air hose 324 connected to the air bag 313 is wound on the hose reel 40. The hose 324 connects to the air bag 313 from the hose reel 40 by passing through guide rollers 41. Hose 324 is fed from the hose reel 40 as required by movement of the fork 305. Hose 324 is wound onto the hose reel 40 by spring loading (not illustrated) allowing the hose to be supplied without slack.

As shown by the broken lines of FIG. 9 and FIG. 10, a driving means with this configuration is capable of moving the forks 305 such that they project off the platform lift 301 to the left or to the right. When the chains 35 are moved in the direction indicated by the solid arrow of FIG. 9, the chains' driving pieces 37 move the fork shafts 38 from left to right causing the forks 305 to move to the right. When rotation of the motor 36 is reversed and the chains 35 are driven in the direction indicated by the broken arrow, the chains' driving pieces 37 push on the right side of the shafts 38, and the forks 305 are moved from right to left.

With this driving means the forks can be driven by numerous driving pieces 37 simultaneously applying distributed pressure on numerous shafts 38. As the forks 305 are moved to project off the platform lift 301 to either the left or right, the number of shafts 38 that the driving pieces can push against is reduced. By designing the driving pieces 37 and the shafts 38 strong enough for the forks 305 to be moved by one driving piece pushing against one shaft, the forks 305 can be moved until only one driving piece pushes against one shaft.

Figure 12:
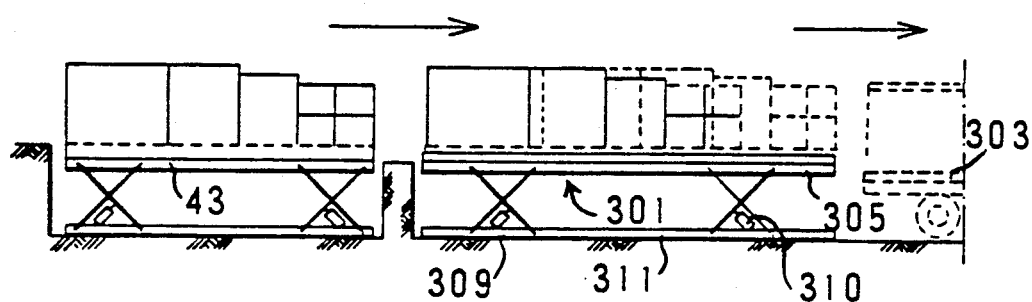

As shown in FIG. 12, a loading apparatus in which the forks 305 can be moved to project off of both the front and rear of the platform lift 301 may be provided with an adjacent loading lift 43 which can be used to further improve cargo loading efficiency.

The loading apparatus shown in this figure is provided with a loading lift 43 at the side opposite where the truck T approaches. A loading apparatus of the type described above with the fork lift body 2 removed can be used as the loading lift 43. The purpose of the loading lift 43 is to allow the cargo to be stacked into the truck T. Cargo loaded onto the loading lift 43 is transferred to the adjacent platform lift 301 with the forks 305 and then loaded into the cargo bed N of the truck T.

Consequently, the loading lift 43 can be raised to the same height as the platform lift 301 of the loading apparatus. Further, to allow cargo on the loading lift 43 to be transferred to the loading apparatus with the forks 305, a cargo stand of the type used in the truck T is provided on the upper surface of the loading lift 43 with the troughs of the cargo stand aligned with the trajectory of fork 305 movement. The forks 305 are inserted into the troughs of the cargo stand 303 to carry cargo loaded on the loading lift 43 to the loading apparatus. When cargo is transferred from the loading lift 43 to the loading apparatus with the forks 305, the elevator forks 304 are lowered, the forks are inserted into the troughs of the cargo stand on top of the loading lift 43, and then the elevator forks 304 are raised and the cargo is moved from the loading lift 43 to the loading apparatus.

A loading apparatus including this type of loading lift 43 can improve cargo loading efficiency when operated in the following manner.

(1) First, the cargo to be loaded into the truck T is stacked onto the cargo stand on the loading lift 43.

(2) The cargo on the loading lift 43 is carried from the loading lift 43 to the loading apparatus. The loading apparatus assumes a standby condition ready to immediately load the cargo into the truck T when it arrives.

(3) With the loading lift's cargo moved to the loading apparatus, cargo is once again stacked onto the emptied loading lift 43.

(4) When the cargo is moved from the loading apparatus into the truck T, the next cargo stacked on the loading lift 43 is transferred to the loading apparatus.

When no loading lift 43 is provided, the next batch of cargo cannot be stacked until the last batch of cargo is loaded into the truck T. However, for loading apparatus provided with a loading lift 43, the next batch of cargo can be stacked while the last batch of cargo sits on the loading apparatus. For this reason, cargo can be immediately loaded when the truck T arrives, and further, cargo stacking in preparation for the next truck can be accomplished while the last truck's cargo remains stacked on the loading apparatus. This loading apparatus, thus has the advantage that cargo loading efficiency is drastically improved by stocking the batches of cargo to be loaded in advance.

Further, the loading lift 43 can also be used for temporarily stocking cargo unloaded from the truck T. Efficiency can be improved by using the loading lift to stock cargo unloaded to the loading apparatus from trucks bringing in loads of cargo one after another.

Figure 13:
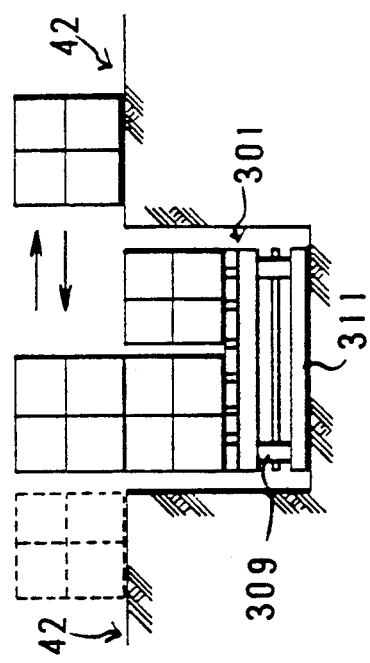

Turning to FIG. 13, a loading apparatus having a vertically movable platform lift 301 vertically movable relative to base 311 via struts 309 disposed adjacent platform 42 can reduce cargo loading labor and prevent cargo damage.

As shown in this diagram, to stack cargo in a plurality of layers, first the platform lift 301 is raised to be in the same plane as the platform 42 and cargo is loaded onto the platform lift. Next, the platform lift 301 is lowered to align the top of the loaded cargo with the plane of the platform 42 and another layer of cargo is loaded.

The platform lift 301 is unloaded in a similar manner. First, the platform lift 301 is lowered to align the bottom of the top layer of cargo with the platform 42 and the top layer of cargo is unloaded. Next, the platform lift 301 is raised to align the bottom of the next layer of cargo with the platform 42 and the next layer of cargo is removed from the platform lift 301. This action is repeated to remove subsequent layers of cargo from the platform lift 301.

In other words, since the cargo need only to be moved horizontally, this system is characterized by facilitating a reduction of cargo loading labor and the prevention of cargo damage.

Figure 14:
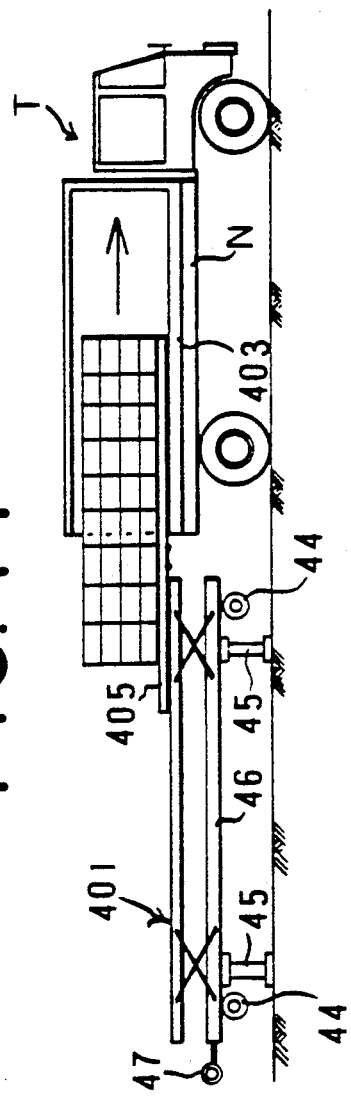

As shown in FIG. 14, a loading apparatus which doubles as a fork lift can stack cargo easily. The elevator means of this loading apparatus rides on a wheel frame 46 provided with wheels 44 and outriggers 45. The wheel frame 46 has at least three wheels 44 to allow it to be moved freely, and at least three outriggers 45 to stabilize it at any position to which it is moved. The wheel frame 46 is also provided with a towing hook 47 to allow it to be towed.

With the outriggers 45 in the retracted position, a loading apparatus with this structure can be towed freely by a fork lift or the like. After the loading apparatus has been moved to the designated position, the outriggers 45 are extended and the platform lift 401 is raised to a fixed position while maintaining it horizontal. This platform lift 401 has the advantage that since it is freely accessible all around its perimeter, a fork lift or such can be used to efficiently load cargo from both sides as well as from the front and back. Further, since the entire loading apparatus is mobile, the cargo can first be put on the loading apparatus, then the loading apparatus can be moved next to a refrigeration or cooling truck, the platform lift 401 can be lined up with the cargo bed N of the paneled truck T, and the stacked cargo can be transferred.

Incidentally, in the loading apparatus of this invention, the forks which transfer the cargo are moved from the platform lift to the cargo stand on the cargo bed N. When the forks 405 are on the platform lift 401, they are supported by the platform lift 401, and when the forks 405 are on the cargo stand 403 they are supported by the cargo stand 403. Consequently, if there is any height difference between the platform lift 401 and the cargo stand 403 in the plane that the forks 405 run along, bending stresses will be applied to the forks 405 in the vertical plane.

Before the forks 405 are moved from the platform lift 401 to the cargo stand 403, the height of the platform lift 401 is adjusted equal to that of the cargo stand 403. Consequently, in this condition the forks 405 move horizontally from the platform lift 401 to the cargo stand 403. However, when the cargo is transferred to the truck T, as shown in FIG. 15, the truck's suspension compresses and the cargo bed N lowers somewhat. When the height of the cargo bed N is lowered, a height difference between the platform lift 501 and the cargo stand 503 is created, and a bending force in the vertical direction is applied to the forks 505.

Further, when cargo is unloaded from the truck T to the platform lift 501, the cargo stand 503 raises as cargo is moved from the truck T to the platform lift 501.

This problem can be solved by adjusting the height of the platform lift 501 with the vertical movement of the cargo bed N. This can be realized by remotely controlling the platform lift 501 while observing the height difference between the cargo bed N and the platform lift 501.

Level adjustment can also be done automatically by detecting the platform lift 501 and cargo bed N height difference with a level sensor and regulating the vertical position of the platform lift 501 to that of the cargo bed N. In this case the level sensor detects the level difference between the platform lift 501 and the cargo bed N, and the platform lift 501 is raised or lowered according to the signal from the level sensor to adjust the vertical position of the platform lift 501 with that of the cargo bed N.

Instead of a level sensor, the amount of strain on the forks 505 in the vertical direction can be detected. For this, a strain gauge can be used on the forks 505.

As shown in FIG. 16, when the cargo is transferred from the platform lift to the cargo bed N of the truck T, the cargo can be moved more smoothly along an incline in which the cargo bed N is slightly down slope from the platform lift 601. Conversely, although it is not illustrated, cargo can be more smoothly unloaded from the truck T to the platform lift when the platform lift 601 is slightly lower than the cargo bed N of the truck T.

In the loading apparatus of this invention, the forks transfer cargo between the platform lift and the cargo bed N with the platform lift adjusted to the same horizontal plane as the cargo stand on the cargo bed N. However, as described above, since the cargo transfer can be made smoother with a slight incline, it is not always necessary for the platform lift and the cargo stand on the cargo bed N to be exactly horizontal. Further, normally truck parking spaces adjacent the platforms of truck loading docks are slightly inclined at a slope $\theta$, allowing rain to run off, as shown in FIG. 16. Therefore, for purposes of this specification, the word horizontal is used with the broader meaning to include slopes at which the cargo on the platform lift 601 can be transferred.

It is desirable for the forks provided on this loading apparatus to have a plurality of prongs, but as shown in FIG. 17, a single pronged fork 705 is also possible.

Turning to FIG. 17, the loading apparatus shown is suitable for small trucks. This loading apparatus comprises a cargo stand 703 with a single trough 708 between two ridges 707, and a single pronged fork 705 which is insertable into the trough 708 of the cargo stand 703. This loading apparatus has the advantage that its structure is extremely simple. However, a loading apparatus of this structure requires that small cargo be put on a pallet 48 for loading. This is necessary because small cargo cannot be loaded across the width of the cargo bed N with the single pronged fork 705.

As shown in FIG. 18, a loading apparatus having forks 805 with a plurality of prongs has the advantage that small cargo can be loaded without the use of pallets. With the exception of oversized trailer trucks, Japanese traffic laws limit vehicle width to 2500 mm. Assuming that the width of the ridges 807 and troughs 808 are equal, and that the truck width is divided into 11 equal segments, the width of each ridge 807 and trough 808 will be 277 mm. A fork 805 with this prong arrangement can load relatively small cargo with widths greater than about 450 to 680 mm without using pallets.

Further, the loading apparatus with ridges at both ends shown in FIG. 18 has the advantage that the same loading apparatus can be used for loading both large and medium size trucks. The cargo stand 803 used for large size trucks has ridges 807 at both sides of the cargo stand 803 as shown in the diagram, while the cargo stand 803 for medium size trucks has the outer ridges 807 omitted.

The ridges may also be made with a large width for large size trucks and a small width for medium size trucks.

Incidentally, the shallower the toughs 808 of the cargo stand 803, the larger the cargo volume on the cargo bed N of the truck T. The depth of the troughs 808 is determined by the height of the forks 805 that are inserted into them. Considering the fork 805 strength required to support the cargo weight, with the elevator forks 804 in the down position, the fork height should be 50 to 100 mm. Consequently, the trough depth is selected so as to allow forks 805 of this height to move with the elevator forks 804 down and load and unload the cargo.

In this invention, the raising and lowering mechanism for the elevator forks is not limited to air bags, and any system which can move the elevator forks vertically may be used. However, air bags have the advantage that heavy cargo on the forks can be raised without problems.

Compressed air for raising the cargo with air bags does not need to be extremely high pressure. For example, a standard large size 11 ton truck T has a cargo bed N with an area of 22 square meters. If 11 tons of cargo are loaded on this area, each square meter supports 0.5 ton. If an air bag of the same area as the cargo bed N is used, in other words if the entire area of the cargo bed N is to be raised with an air bag, the load would require at least 0.5 kg/cm$^2$ of air pressure.

However, the air bag does not lift the entire cargo bed N. If the air bag lifts one fifth of the cargo bed N area, at least 2.5 kg/cm$^2$ of air pressure is needed, and if it lifts one tenth of the cargo bed N area, at least 5 kg/cm$^2$ is required. Air bags designed to withstand this order of air pressure magnitude can be easily manufactured.

In the preferred embodiment of the present invention the number of fork prongs can be small when pallets are used, but even when pallets are not used, relatively small cargo can be loaded and versatility is improved by using a larger number of fork prongs.

What is claimed is:

1. Fork lift style loading apparatus for loading cargo into and for unloading cargo from a truck, said apparatus comprising:

a platform lift having a horizontally disposed upper surface extending in a longitudinal direction, and elevating means for raising and lowering said upper surface;

a fork lift body disposed on the upper surface of said platform lift and having at least one fork extending longitudinally of the upper surface of said platform lift, said at least one fork being movable back and forth longitudinally of the upper surface of said platform lift to extend and retract said at least one fork from said upper surface, each said at least one fork including an elevator fork, raising and lowering means operatively connected to said elevator fork for raising and lowering said elevator fork over small intervals relative to the upper surface of said platform lift, and wheels in rolling engagement with said platform lift so as to rollingly support the at least one fork as the at least one fork is moved back and forth longitudinally of the upper surface of said platform lift;

a cargo stand mountable on the cargo bed of a truck, said cargo stand having an upper surface defining ridges and at least one trough, each said at least one fork being insertable into a respective said at least one trough when said cargo stand is mounted on the cargo bed of a truck, the elevator fork of each said at least one fork being raisable by said raising and lowering means to a position at which the upper surface thereof is disposed above said ridges with said cargo stand mounted on the cargo bed of a truck, and the elevator fork of each said at least one fork being lowerable by said raising and lowering means to a position at which the upper surface thereof is disposed below said ridges with said cargo stand mounted on the cargo bed of a truck, and;

driving means for moving each said at least one fork back and forth longitudinally of the upper surface of said platform lift, said driving means including sprocket shafts extending horizontally and transversely of said at least one fork, sprockets mounted on said sprocket shafts so as to rotate therewith, an endless chain trained around said sprockets and having upper and lower runs extending parallel to said at least one fork with the upper run disposed below and adjacent to said at least one fork, and a driving piece connected to said endless chain and engaging said at least one fork, whereby when said sprockets are rotated, the endless chain is driven and said at least one fork is moved longitudinally of the upper surface of the platform lift owing to the engagement thereof by said driving piece.

2. Fork lift style loading apparatus as claimed in claim 1, wherein said at least one fork comprises a plurality of forks spaced laterally apart from one another, and said at least one trough comprises a plurality of troughs.

3. Fork lift style loading apparatus as claimed in claim 1, and further comprising lateral moving means supported on said platform lift and connected to each said at least one fork for moving each said at least one fork laterally relative to the upper surface of said platform lift.

4. Fork lift style loading apparatus comprising:
a platform lift having a horizontally disposed upper surface extending in a longitudinal direction, and elevating means for raising and lowering said upper surface;

a fork lift body disposed on the upper surface of said platform lift and having at least one fork extending longitudinally of the upper surface of said platform lift, said at least one fork being movable back and forth longitudinally of the upper surface of said platform lift to extend and retract said at least one fork from said upper surface, each of said at least one fork including an elevator fork, raising and lowering means operatively connected to said elevator fork for raising and lowering said elevator fork over small intervals relative to the upper surface of said platform lift, and wheels in rolling engagement with said platform lift so as to rollingly support the at least one fork as the at least one fork is moved back and forth longitudinally of the upper surface of said platform lift, and;

driving means for moving each said at least one fork back and forth longitudinally of the upper surface of said platform lift, said driving means including sprocket shafts extending horizontally and transversely of said at least one fork, sprockets mounted on said sprocket shafts so as to rotate therewith, an endless chain trained around said sprocket and having upper and lower runs extending parallel to said at least one fork with the upper run disposed below and adjacent to said at least one fork, and a driving piece connected to said endless chain and engaging said at least one fork, whereby when said sprockets are rotated, the endless chain is driven and said at least one fork is moved longitudinally of the upper surface of the platform lift owing to the engagement thereof by said driving piece.

5. Fork lift style loading apparatus as claimed in claim 4, wherein said at least one fork comprises a plurality of forks spaced laterally apart from one another.

6. Fork lift style loading apparatus as claimed in claim 4, and further comprising lateral moving means supported on said platform lift and connected to each said at least one fork for moving each said at least one fork laterally relative to the upper surface of said platform lift.

* * * * *